United States Patent
Schubert

(10) Patent No.: US 11,630,932 B2
(45) Date of Patent: Apr. 18, 2023

(54) TECHNIQUES FOR USING RANDOM PERTURBATIONS DURING AN INVERSE DESIGN PROCESS TO OBTAIN FABRICABLE DESIGNS

(71) Applicant: X Development LLC, Mountain View, CA (US)

(72) Inventor: Martin Schubert, Mountain View, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 303 days.

(21) Appl. No.: 17/036,722

(22) Filed: Sep. 29, 2020

(65) Prior Publication Data

US 2022/0100914 A1    Mar. 31, 2022

(51) Int. Cl.
| | | |
|---|---|---|
| G06F 30/23 | (2020.01) | |
| G06F 111/08 | (2020.01) | |
| G02B 27/00 | (2006.01) | |
| G06F 30/10 | (2020.01) | |
| G06F 119/18 | (2020.01) | |
| G06F 111/06 | (2020.01) | |

(52) U.S. Cl.
CPC .............. *G06F 30/23* (2020.01); *G06F 30/10* (2020.01); *G02B 27/0012* (2013.01); *G06F 2111/06* (2020.01); *G06F 2111/08* (2020.01); *G06F 2119/18* (2020.01)

(58) Field of Classification Search
CPC ...... G06F 30/23; G06F 30/10; G06F 2111/06; G06F 2111/08; G06F 2119/18; G02B 27/0012; Y02P 90/02
See application file for complete search history.

(56) References Cited

U.S. PATENT DOCUMENTS

| | | | | |
|---|---|---|---|---|
| 10,474,953 | B2* | 11/2019 | Thompson | G06N 3/126 |
| 11,340,585 | B2* | 5/2022 | Aydin | B33Y 50/02 |
| 2021/0356738 | A1* | 11/2021 | Fan | G06N 3/084 |

OTHER PUBLICATIONS

Spall, J. "An Overview of the Simultaneous Perturbation Method for Efficient Optimization" Johns Hopkins APL Technical Digest, vol. 19, No. 4 (1998) (Year: 1998).*
Lu, S., et al. "PA-GD: On the Convergence of Perturbed Alternating Gradient Descent to Second-Order Stationary Points for Structured Nonconvex Optimization" Proceedings of the 36th Int'l Conf. on Machine Learning (2019) (Year: 2019).*
J. Jiang, et al., "Dataless training of generative models for the inverse design of metasurfaces," arXiv:1906.07843v1 [physics.comp-ph], Jun. 18, 2019, pp. 1-10.
B. Hu, et al., "Robust inverse-design of scattering spectrum in core-shell structure using modified denoising autoencoder neural network," Optics Express, vol. 27, No. 25 / Dec. 9, 2019 / Optics Express 36276, 10 pages.

* cited by examiner

*Primary Examiner* — Jay Hann
(74) *Attorney, Agent, or Firm* — Christensen O'Connor Johnson Kindness PLLC

(57) ABSTRACT

A method of creating a fabricable segmented design for a physical device is provided. A computing system receives a design specification. The computing system optimizes an initial segmented design based on the design specification to create an improved segmented design. The computing system perturbs the improved segmented design to create a perturbed segmented design. The computing system optimizes the perturbed segmented design to create a second improved segmented design.

18 Claims, 12 Drawing Sheets

TECHNIQUES FOR USING RANDOM PERTURBATIONS DURING AN INVERSE DESIGN PROCESS TO OBTAIN FABRICABLE DESIGNS

TECHNICAL FIELD

This disclosure relates generally to designing and manufacturing physical devices, and in particular but not exclusively, relates to inverse design of optical and electromagnetic devices.

BACKGROUND

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply generate device designs without considering whether the generated designs can be fabricated. A need exists for techniques for measuring and verifying the fabricability of device designs.

BRIEF SUMMARY

In some embodiments, a non-transitory computer-readable medium is provided. The computer-readable medium has logic stored thereon that, in response to execution by one or more processors of a computing system, causes the computing system to perform actions for creating a fabricable segmented design for a physical device. The actions comprise receiving, by the computing system, a design specification; optimizing, by the computing system, an initial segmented design based on the design specification to create an improved segmented design; perturbing, by the computing system, the improved segmented design to create a perturbed segmented design; and optimizing, by the computing system, the perturbed segmented design to create a second improved segmented design.

In some embodiments, a method of creating a fabricable segmented design for a physical device is provided. A computing system receives a design specification. The computing system optimizes an initial segmented design based on the design specification to create an improved segmented design. The computing system perturbs the improved segmented design to create a perturbed segmented design. The computing system optimizes the perturbed segmented design to create a second improved segmented design.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1A:
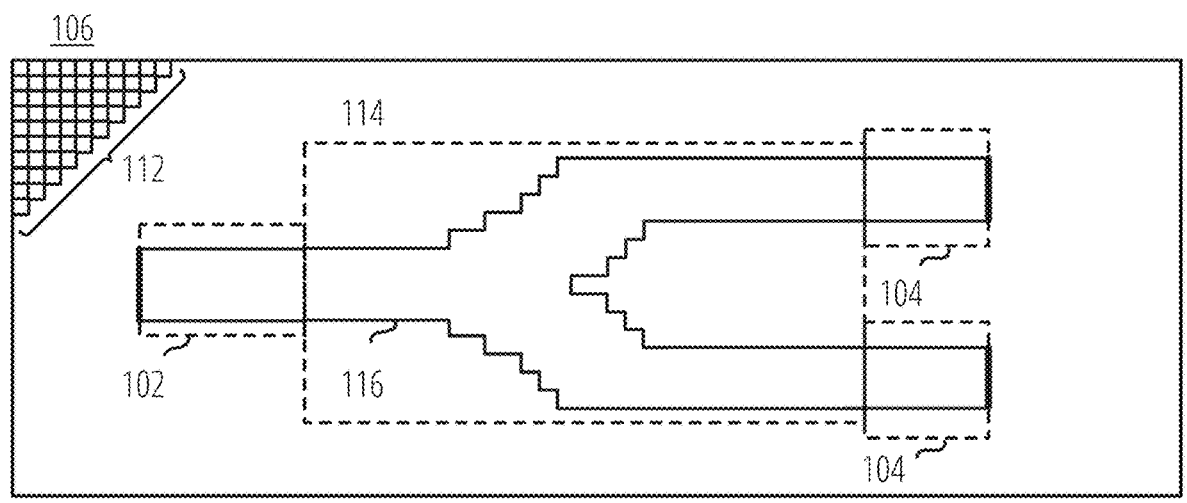
FIG. 1A illustrates a demonstrative simulated environment describing a photonic integrated circuit, in accordance with an embodiment of the present disclosure.
Figure 1B:
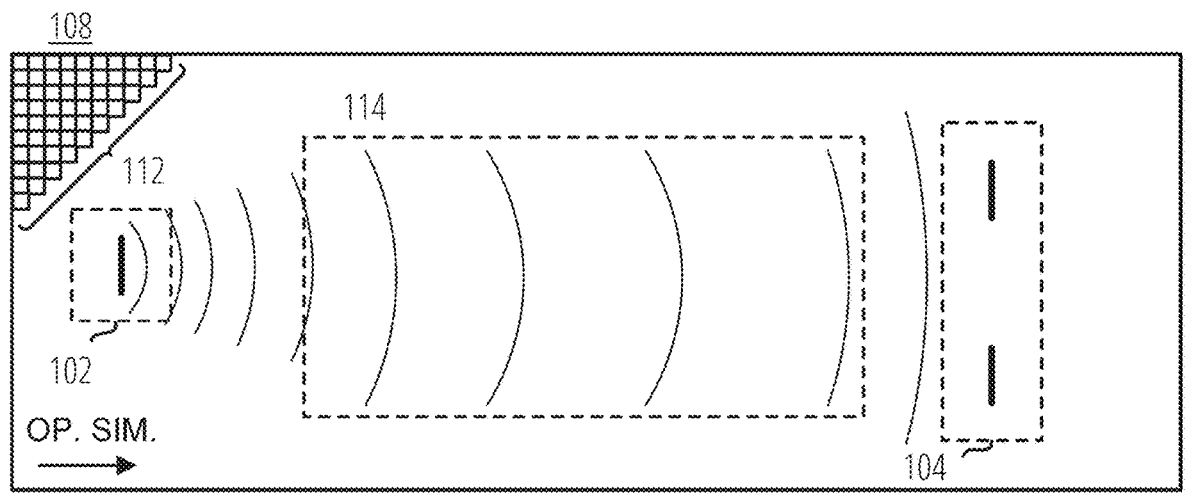
FIG. 1B illustrates an example operational simulation of a photonic integrated circuit, in accordance with an embodiment of the present disclosure.
Figure 1C:
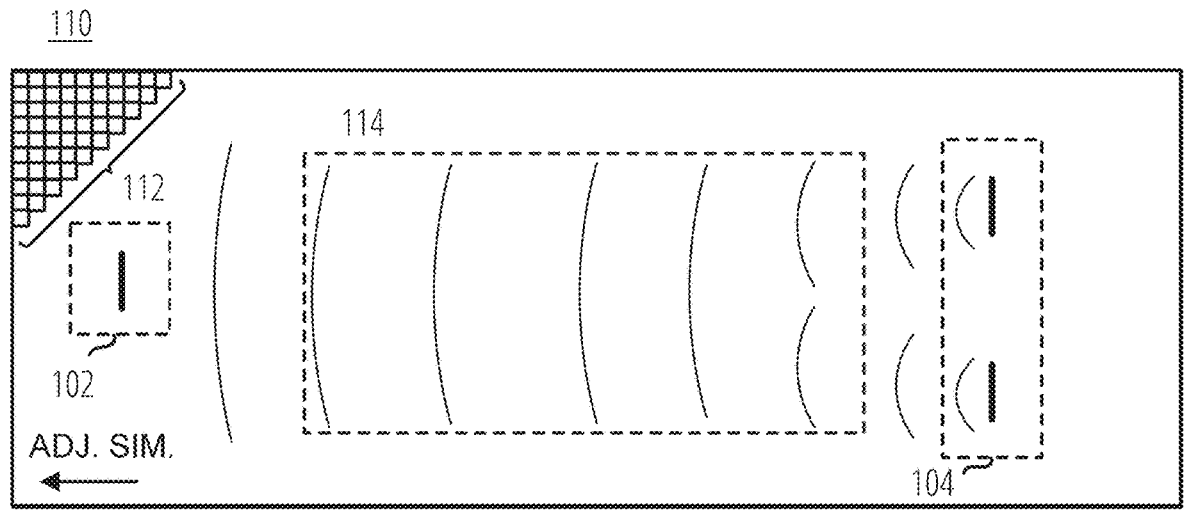
FIG. 1C illustrates an example adjoint simulation within the simulated environment by backpropagating a loss value, in accordance with an embodiment of the present disclosure.

FIG. 1A-FIG. 1C respectively illustrate an initial set up of a simulated environment describing a photonic device, performing an operational simulation of the photonic device in response to an excitation source within a simulated environment, and performing an adjoint simulation of the photonic device within a simulated environment. As illustrated in FIG. 1A-FIG. 1C, simulated environment is represented in two-dimensions. However, it is appreciated that other dimensionality (e.g., 3-dimensional space) may also be used to describe simulated environment and the photonic device. In some embodiments, optimization of structural parameters of the photonic device illustrated in FIG. 1A-FIG. 1C may be achieved via an inverse design process including, inter alia, simulations (e.g., operational simulations and adjoint simulations) that utilize a finite-difference time-domain (FDTD) method to model the field response (e.g., electric and magnetic field) to an excitation source.

FIG. 1A illustrates a demonstrative simulated environment 106 describing a photonic integrated circuit (i.e., a photonic device such as a waveguide, demultiplexer, and the like), in accordance with an embodiment of the present disclosure. More specifically, in response to receiving an initial description of a photonic device defined by one or more structural parameters (e.g., an input design), a system configures a simulated environment 106 to be representative of the photonic device. As illustrated, the simulated environment 106 (and subsequently the photonic device) is described by a plurality of segments 112, which represent individual elements (i.e., discretized) of the two-dimensional (or other dimensionality) space. Each of the segments 112 is illustrated as two-dimensional squares; however, it is appreciated that the segments may be represented as cubes or other shapes in three-dimensional space. It is appreciated that the specific shape and dimensionality of the plurality of segments 112 may be adjusted dependent on the simulated environment 106 and photonic device (or other physical device) being simulated. It is further noted that only a portion of the plurality of segments 112 are illustrated to avoid obscuring other aspects of the simulated environment 106.

Each of the plurality of segments 112 may be associated with a structural value, a field value, and a source value. Collectively, the structural values of the simulated environment 106 describe the structural parameters of the photonic device. In one embodiment, the structural values may correspond to a relative permittivity, permeability, and/or refractive index that collectively describe structural (i.e., material) boundaries or interfaces of the photonic device. For example, an interface 116 is representative of where relative permittivity changes within the simulated environment 106 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of segments 112. Thus, the field response may be based, at least in part, on the structural parameters of the photonic device and the excitation source.

In the illustrated embodiment, the photonic device corresponds to an optical demultiplexer having a design region 114, in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 102 to a corresponding one of the output ports 104. Thus, input port 102 of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 106). In other words, the excitation source may cause the field response of the photonic device to change, which is dependent on the underlying physics governing the physical domain and the structural parameters of the photonic device. The excitation source originates or is otherwise proximate to input port 102 and is positioned to propagate (or otherwise influence the field values of the plurality of segment) through the design region 114 towards output ports 104 of the photonic device.

In the illustrated embodiment, the input port 102 and output ports 104 are positioned outside of the design region 114. In other words, in the illustrated embodiment, only a portion of the structural parameters of the photonic device is optimizable.

However, in other embodiments, the entirety of the photonic device may be placed within the design region 114 such that the structural parameters may represent any portion or the entirety of the design of the photonic device. The electric and magnetic fields within the simulated environment 106 (and subsequently the photonic device) may change (e.g., represented by field values of the individual segment that collectively correspond to the field response of the simulated environment) in response to the excitation source. The output ports 104 of the optical demultiplexer may be used for determining a performance metric of the photonic device in response to the excitation source (e.g., power transmission from input port 102 to a specific one of the output ports 104). The initial description of the photonic device, including initial structural parameters, excitation source, performance parameters or metrics, and other parameters describing the photonic device, may be received by a system and used to configure the simulated environment 106 for performing a first-principles based simulation of the photonic device. These specific values and parameters may be defined directly by a user, indirectly (e.g., by a system culling pre-determined values stored in a memory, local storage, or remote resources), or a combination thereof.

FIG. 1B illustrates an operational simulation of the photonic device in response to an excitation source within simulated environment 108, in accordance with various aspects of the present disclosure. In the illustrated embodiment, the photonic device is an optical demultiplexer structured to optically separate each of a plurality of distinct wavelength channels included in a multi-channel optical signal received at input port 102 and respectively guide each of the plurality of distinct wavelength channels to a corresponding one of the plurality of output ports 104. The excitation source may be selected (randomly or otherwise) from the plurality of distinct wavelength channels and originates at input port 102 having a specified spatial, phase, and/or temporal profile. The operational simulation occurs over a plurality of time steps, including the illustrated time step. When performing the operational simulation, changes to the field response (e.g., the field value) for each of the plurality of segments 112 are incrementally updated in response to the excitation source over the plurality of time steps. The changes in the field response at a particular time step are based, at least in part, on the structural parameters, the excitation source, and the field response of the simulated environment 110 at the immediately prior time step included in the plurality of time steps. Similarly, in some embodiments the source value of the plurality of segments 112 is updated (e.g., based on the spatial profile and/or temporal profile describing the excitation source). It is appreciated that the operational simulation is incremental and that the field values (and source values) of the simulated environment 110 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In some embodiments, the performance metric corresponds to the power transmission at a corresponding one of the output ports 104 mapped to the distinct wavelength channel being simulated by the excitation source. In other words, in some embodiments, the performance metric represents power (at one or more frequencies of interest) in the target mode shape at the specific locations of the output ports 104. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric). It is noted that the loss metric may be further based on a fabrication loss value that is utilized to enforce a minimum feature size or other fabricability constraints of the photonic device to promote fabricability of the device.

FIG. 1C illustrates an example adjoint simulation within simulated environment 110 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 104) or other location that corresponds to a location used when determining the performance metric. The adjoint source(s) is then treated as a physical stimuli or an excitation source during the adjoint simulation. A loss response of the simulated environment 110 is computed for each of the plurality of time steps (e.g., backwards in time) in response to the adjoint source. The loss response collectively refers to loss values of the plurality of segment that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performed while maintaining fabricability.

Figure 2:
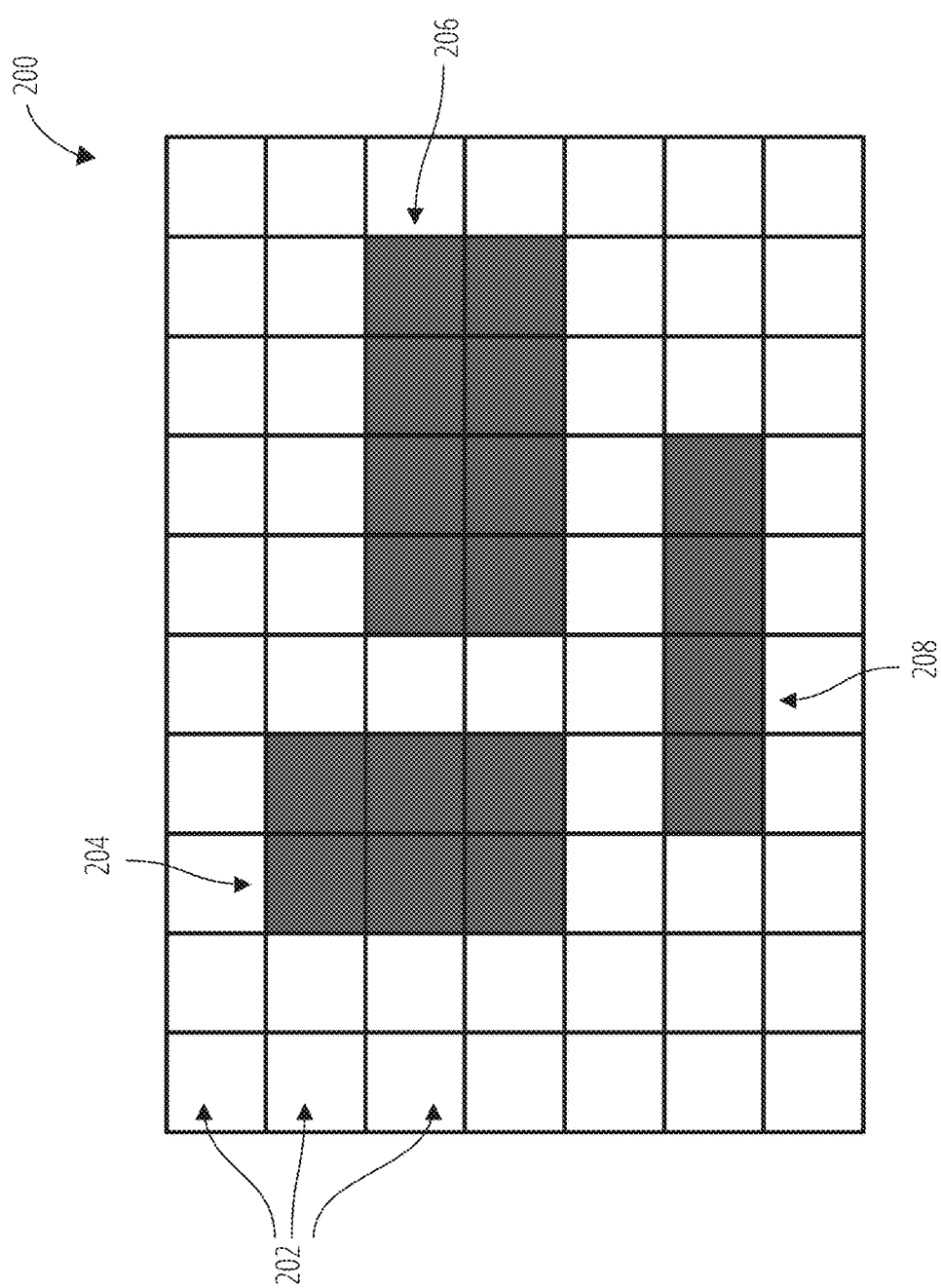
FIG. 2 is a schematic drawing that illustrates a non-limiting example embodiment of a segmented design according to various aspects of the present disclosure.

FIG. 2 is a schematic drawing that illustrates a non-limiting example embodiment of a segmented design according to various aspects of the present disclosure. The segmented design 200 is a non-limiting example of content suitable for insertion in the design region 114 described above (though not drawn to the scale or with the same granularity of segmentation). As shown, the segmented design 200 includes a plurality of segments 202 laid out in a two-dimensional grid. Each of the segments 202 represents a location in the proposed segmented design that can either include a material or not include a material. As illustrated, segments that are white indicate a lack of the material, and segments that are dark (such as the first pattern 204, the second pattern 206, and the third pattern 208, indicate a presence of the material. For example, in a photolithography process, segments that are white may represent locations that are not exposed, and segments that are dark may represent locations that are exposed during the photolithography process. As another example, in an additive manufacturing process (e.g., a 3-D printer), segments that are white may represent locations that do not include material, and segments that are dark may represent locations that do include material.

This description is a non-limiting example only, and in some embodiments, the white and dark segments may have another meaning within the segmented design 200. In some embodiments, the segmented design 200 may include more than two colors. For example, a white segment may indicate a lack of material, a segment in a first color may indicate presence of a first material, and a segment in a second color may indicate a presence of a second material. In some embodiments, the segmented design 200 may be three-dimensional or one-dimensional, instead of the two-dimensional segmented design 200 illustrated in FIG. 2.

Typically, a fabrication system can duplicate any segmented design provided to it, subject to certain constraints. For example, a minimum feature size, a minimum feature shape, or any other constraint may be specified by the fabrication system as limitations on the segmented designs that the fabrication system can fabricate. From these constraints, a "paintbrush pattern" can be determined. In some embodiments, the paintbrush pattern represents a smallest feature that can be generated by a given fabrication system. If a given segmented design can be created by tiling the paintbrush pattern over the segmented design, then the segmented design is fabricable using the associated fabrication system. If one or more portions of the segmented design cannot be drawn with the paintbrush pattern, then the segmented design is not fabricable using the associated fabrication system. In some embodiments, if a fabrication system can fabricate devices with more than one material, separate constraints (and therefore separate paintbrush pattern) may be provided for each different material.

Recently, efforts have been made to improve the creation of segmented designs. As discussed above, an inverse design process may be used to create a segmented design, in which the desired performance of the segmented design is specified, a forward simulation is conducted to determine one or more loss values that reflect how well the segmented design performs with respect to the desired performance, and an adjoint simulation is conducted to backpropagate the loss values and update the segmented design to improve the performance. In some embodiments, a fabrication loss that reflects how far the segmented design is from being able to be manufactured by a given fabrication system may also be determined. Typically, backpropagation involves determining gradients for the various losses, and updating the segmented design based on the determined gradients via gradient descent.

Unfortunately, while gradient descent is effective in finding minima of the various loss values, it is common for gradient descent techniques to become stuck in a local minimum, and therefore not find the best segmented design. This may be particularly problematic when gradient descent is used to optimize a fabrication loss, since local minima that represent a non-zero fabrication loss may be associated with segmented designs that are not fabricable.

Accordingly, improvements to gradient descent design techniques are desired that can help avoid being stuck in local minima of the loss functions and therefore ensure that fabricable segmented designs may be generated. In some embodiments of the present disclosure, a segmented design that has been optimized using gradient descent is perturbed such that, upon optimization of the perturbed segmented design, a new optimized segmented design may be generated that represents a different minimum of the various loss functions. Using such techniques, a global minimum (or at least a minimum that represents a segmented design with zero fabrication loss/that is fabricable) is more likely to be found.

Figure 3:
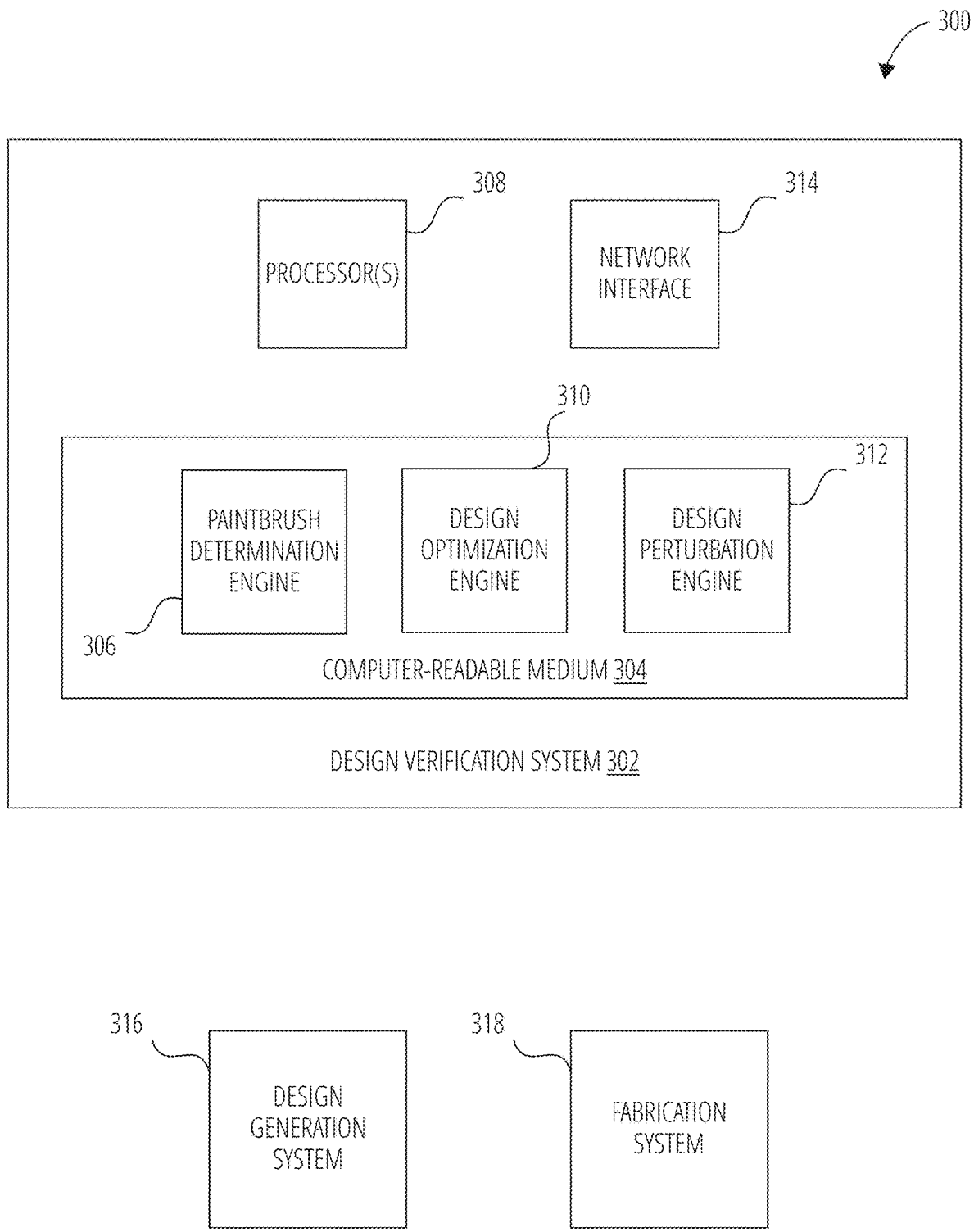
FIG. 3 is a block diagram that illustrates a non-limiting example embodiment of a system according to various aspects of the present disclosure.

FIG. 3 is a block diagram that illustrates a non-limiting example embodiment of a system according to various aspects of the present disclosure. Overall, the illustrated embodiment of the system 300 is configured to generate proposed segmented designs, to establish fabricability of the proposed segmented designs, and to fabricate physical devices based on the proposed segmented designs. In particular, some embodiments of the system 300 are configured to avoid local minima of the various loss functions used to optimize proposed segmented designs by applying random perturbations to the proposed segmented designs in between rounds of optimization.

As shown, the system 300 includes a design generation system 316, a fabrication system 318, and a design verification system 302. Communication between the design generation system 316, the design verification system 302, and the fabrication system 318 may occur via a network (not pictured), via exchange of a removable computer-readable medium (not pictured), or via any other suitable technique. Though the design generation system 316, fabrication system 318, and design verification system 302 are illustrated as separate systems, in some embodiments, some portions of these systems may be combined. As one non-limiting example, the design generation system 316 and the design verification system 302 may be combined in a single system. Also, in some embodiments, systems illustrated in FIG. 3 as a single system may be broken into multiple systems.

In some embodiments, the design generation system 316 may include one or more computing devices that are configured to generate segmented designs that achieve a desired result. For example, the design generation system 316 may use forward simulation and backpropagation techniques to generate a segmented design for an electromagnetic device (or any other type of physical device) that has desired characteristics. This is a non-limiting example only, and any other technique, including but not limited to generative design, genetic design, and manual design, may be used by the design generation system 316 to create proposed segmented designs.

In some embodiments, the fabrication system 318 may be any suitable system for fabricating a segmented design. In some embodiments, the fabrication system 318 may be a photolithography system or an additive manufacturing system. In some embodiments, the fabrication system 318 may have characteristics that include a minimum feature size, a minimum feature shape, and/or other constraints that help define the segmented designs that the fabrication system 318 is capable of fabricating. To that end, the fabrication system 318 may provide a design rule checker that is configured to process proposed segmented designs in an inefficient legacy manner to determine whether the proposed segmented designs comply with the constraints of the fabrication system 318.

In some embodiments, the design verification system 302 may be any suitable computing device or collection of computing devices configured to provide the described functionality. In some embodiments, the design verification system 302 may be a server computing device, a desktop computing device, a laptop computing device, a mobile computing device, a tablet computing device, or one or more computing devices of a cloud computing system.

As shown, the design verification system 302 includes one or more processors 308, a network interface 314, and a computer-readable medium 304. In some embodiments, the one or more processors 308 may include a plurality of processors and/or a plurality of processing cores in order to provide a large amount of computing power. In some embodiments, the network interface 314 may be configured to communicate with the design generation system 316 and/or the fabrication system 318 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 314, the design verification system 302 may be configured to communicate with the design generation system 316 and/or the fabrication system 318 via transfer of a removable computer-readable medium (not shown).

As shown, the computer-readable medium 304 has stored thereon logic that, in response to execution by the one or more processors 308, cause the design verification system 302 to provide a paintbrush determination engine 306, a design optimization engine 310, and a design perturbation engine 312.

In some embodiments, the paintbrush determination engine 306 is configured to determine one or more paintbrush pattern for a given fabrication system 318. In some embodiments, the paintbrush determination engine 306 may provide test designs to the design rule checker to determine what features would be acceptable, and may use the results of processing the test designs with the design rule checker to determine the one or more paintbrush pattern.

In some embodiments, the design optimization engine 310 is configured to optimize segmented designs using any suitable technique, including but not limited to the forward simulation and backpropagation of loss gradients as described above. In some embodiments, the design perturbation engine 312 is configured to perturb segmented designs optimized by the design optimization engine 310 to escape local minima of the various loss functions used for optimization, as described in further detail below.

As used herein, the term "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As used herein, the term "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Figure 4:
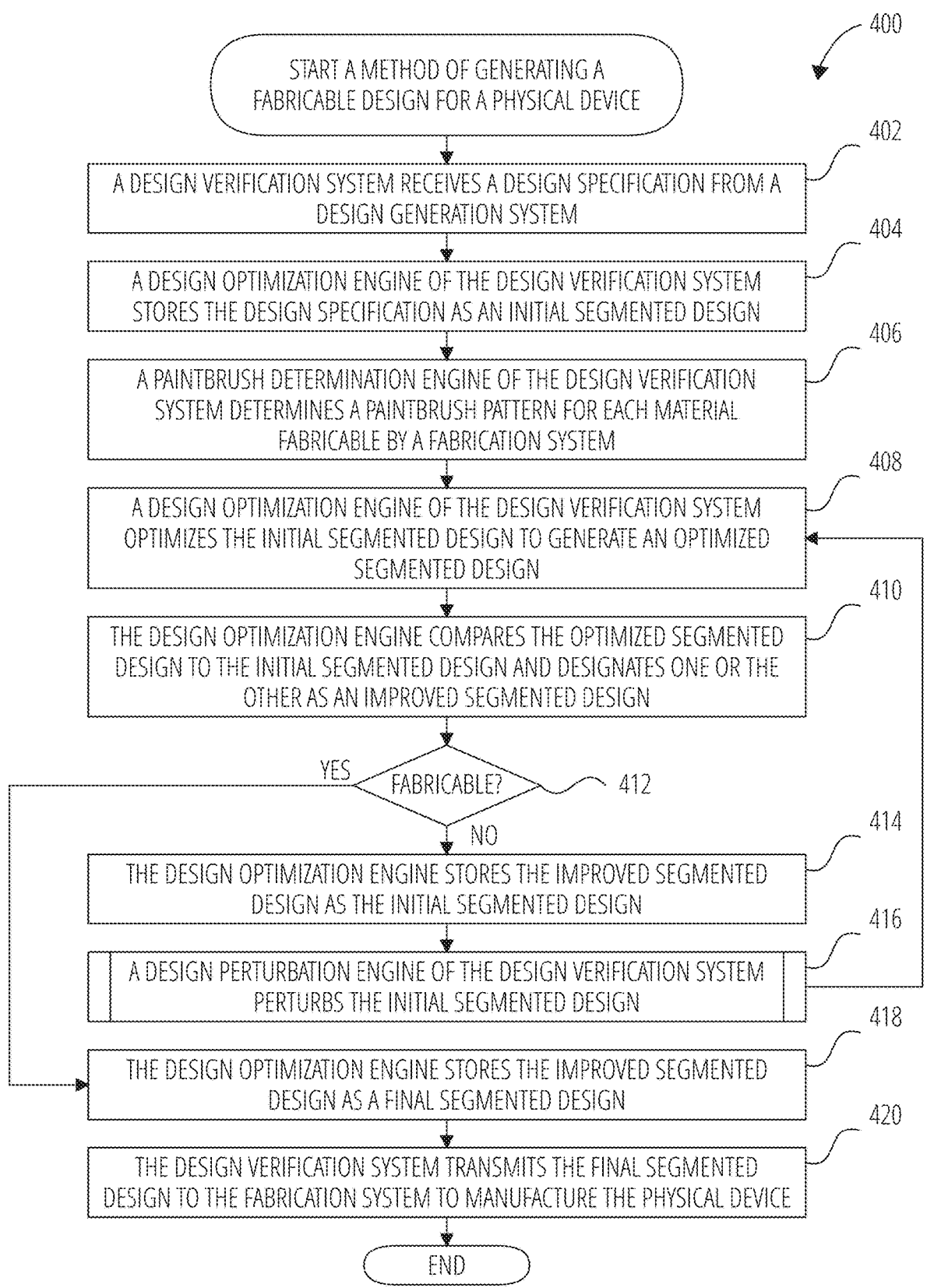
FIG. 4 is a flowchart that illustrates a non-limiting example embodiment of a method of generating a fabricable design for a physical device according to various aspects of the present disclosure.

FIG. 4 is a flowchart that illustrates a non-limiting example embodiment of a method of generating a fabricable design for a physical device according to various aspects of the present disclosure. In general, the method 400 applies random perturbations to a segmented design in between rounds of optimization in order to help the optimization escape local minima in the loss functions used for optimization, and thereby increase the likelihood that a global minimum of the loss functions can be found. In some embodiments, a goal of the perturbation is to escape local minima in a fabrication loss function that do not represent fabricable segmented designs, such that a new minimum that does represent a fabricable segmented design may be found.

From a start block, the method 400 proceeds to block 402, where a design verification system 302 receives a design specification from a design generation system 316. In some embodiments, the design specification may include a segmented design generated randomly, generated using a naive optimization technique, using a technique similar to those used by the design optimization engine 310, generated manually, or generated using any other suitable technique. In some embodiments, the design specification may include a linear function that represents a desired characteristic of the physical device, instead of specifying a segmented design. In some embodiments, the design specification may also include an indication of the desired performance characteristics of the physical device. For example, the design specification may include a performance loss function to be used to evaluate the performance of segmented designs during optimization. As another example, the design specification may include one or more parameters, including but not limited to desired input and/or output wavelengths, to be used by a performance loss function built into the design optimization engine 310.

At block 404, a design optimization engine 310 of the design verification system 302 stores the design specification as an initial segmented design. In embodiments wherein the design specification includes a segmented design, the included segmented design may be stored as the initial segmented design. In embodiments wherein the design specification includes a linear function or otherwise does not itself include a segmented design, the design optimization engine 310 may randomly (or otherwise) generate a segmented design to be stored as the initial segmented design. As will be shown later, the descriptor "initial" in "initial segmented design" merely refers to the fact that it is a segmented design before optimization by the design optimization engine 310. Accordingly, later in the method 400, the initial segmented design may be replaced by a different segmented design during a future iteration, such as at subroutine block 416.

At block 406, a paintbrush determination engine 306 of the design verification system 302 determines a paintbrush pattern for each material fabricable by a fabrication system 318. Any suitable technique may be used to determine the paintbrush pattern for the materials fabricable by the fabrication system 318. For example, in some embodiments, the paintbrush patterns may be determined based on a minimum feature size and/or other capabilities listed in a specification for the fabrication system 318. As another example, in some embodiments, the paintbrush patterns may be determined by providing one or more sample segmented designs to a design rule checker associated with the fabrication system 318, and determining the paintbrush patterns based on which segmented designs (or portions thereof) are found by the design rule checker to be unfabricable. As yet another example, in some embodiments, the paintbrush patterns may be provided manually to the paintbrush determination engine 306.

At block 408, a design optimization engine 310 of the design verification system 302 optimizes the initial segmented design to generate an optimized segmented design. Any of numerous optimization techniques may be used by the design optimization engine 310 to optimize the initial segmented design. In some embodiments, computations are performed to determine one or more loss values, including but not limited to one or more of a performance loss value (indicating how well the initial segmented design implements the desired functionality) and a fabrication loss value (indicating how close the initial segmented design is to being fabricable by the fabrication system 318). Gradients of the performance loss and/or the fabrication loss may be determined and backpropagated through the initial segmented design. Multiple rounds of the forward computation and backpropagation may be conducted to generate the optimized segmented design using gradient descent. In some embodiments, other optimization techniques, including but not limited to genetic design, generative design, engineering optimization, shape optimization, and topology optimization, may be used. In some embodiments, the optimization technique may run until a minimum is reached, or for a predetermined number of iterations.

At block 410, the design optimization engine 310 compares the optimized segmented design to the initial segmented design and designates one or the other as an improved segmented design. Essentially, at block 410, the method 400 checks that the optimized segmented design is better than the initial segmented design in some particular aspect to ensure that an overall improvement is being made. For example, in some embodiments, the method 400 may compare fabrication loss values for the optimized segmented design and the initial segmented design, and may designate the segmented design with the lower fabrication loss value as the improved segmented design in order to push the segmented design toward fabricability. As another example, in some embodiments, instead of comparing overall fabrication loss values, the method 400 may determine how many clusters or contiguous regions of segments in each segmented design include unfabricable segments, and may designate the segmented design with the lower number of unfabricable clusters of segments as the improved segmented design. As still another example, in some embodiments, the method 400 may compare performance loss values for the optimized segmented design and the initial segmented design, and may designate the segmented design with the lower performance loss value as the improved segmented design in order to push the segmented design toward more highly performant designs. As yet another example, in some embodiments, the method 400 may use a first metric (such as the performance loss value comparison) in early iterations to push for increased performance, and may use a second metric (such as the fabrication loss value) in later iterations to push towards fabricability. As a final non-limiting example, in some embodiments, instead of choosing either the optimized segmented design or the initial segmented design as the improved segmented design, the design optimization engine 310 may perform a conflict-free merge on the two segmented designs to create the improved segmented design in order to use the best features of both designs.

The method 400 then proceeds to decision block 412, where a determination is made regarding whether the improved segmented design is fabricable. In some embodiments, the design optimization engine 310 may determine whether the improved segmented design is fabricable by checking whether the fabrication loss value for the improved segmented design meets a threshold that indicates fabricability. For example, if the entire improved segmented design is fabricable, then the fabrication loss value may be zero (indicating that there are no unfabricable portions of the improved segmented design), and zero fabrication loss may be the threshold that indicates fabricability.

If the improved segmented design is determined to not be fabricable, then the result of decision block 412 is NO, and the method 400 proceeds to block 414. At block 414, the design optimization engine 310 stores the improved segmented design as the initial segmented design. In other words, the design optimization engine 310 replaces the previous initial segmented design with the improved segmented design for the next iteration of processing.

Figure 5:
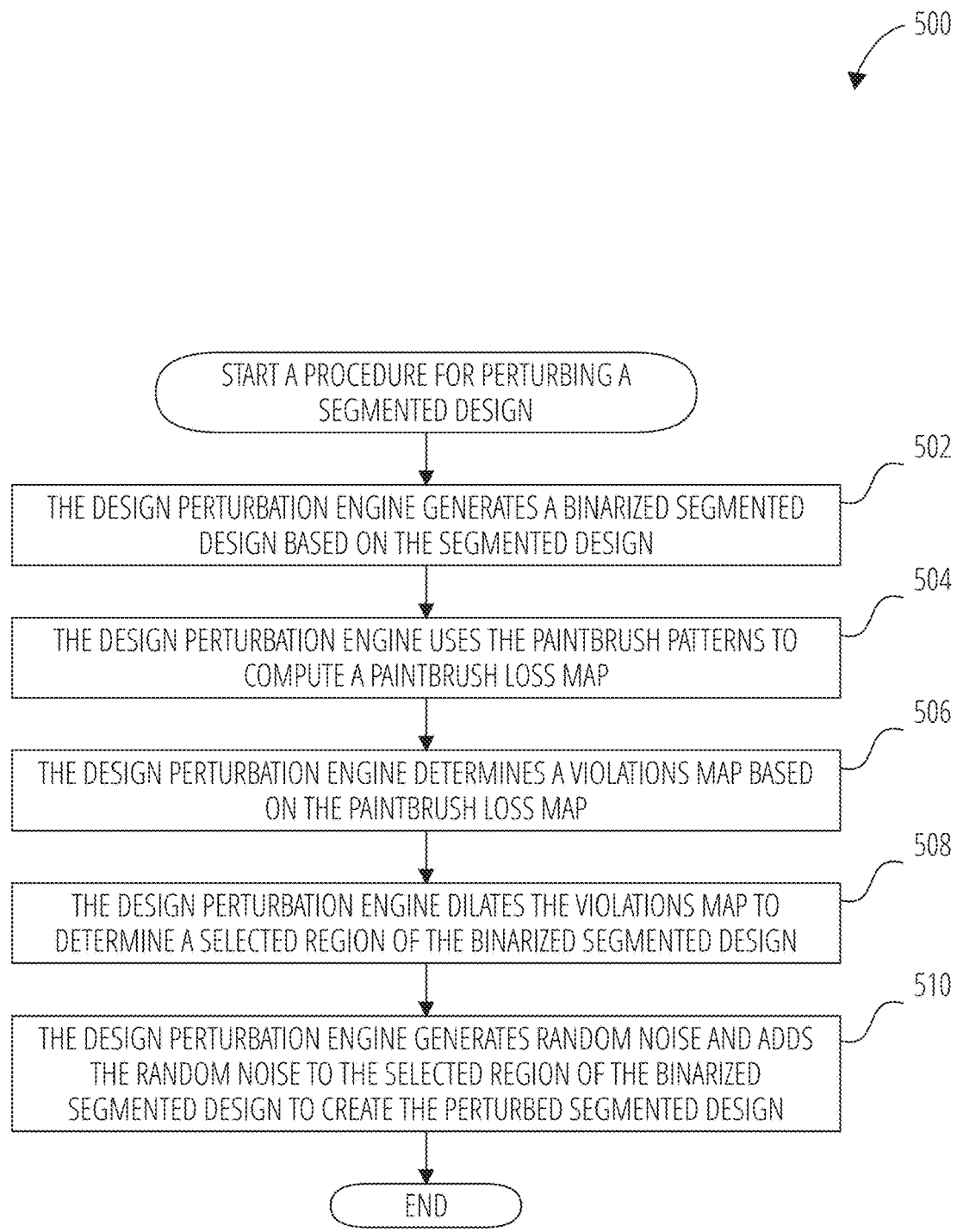
FIG. 5 is a flowchart that illustrates a non-limiting example embodiment of a procedure for perturbing a segmented design according to various aspects of the present disclosure.

At subroutine block 416, a procedure is executed wherein a design perturbation engine 312 of the design verification system 302 perturbs the initial segmented design. This perturbation of the initial segmented design is intended to move the initial segmented design outside of the minimum of the performance loss function and fabrication loss function represented by the improved segmented design, such that a subsequent optimization will approach a different minimum. Any suitable perturbation technique may be used. A non-limiting example embodiment of a technique for perturbing the initial segmented design is illustrated in FIG. 5 and discussed in further detail below. The method 400 then returns to block 408, where the perturbed initial segmented design is again optimized to attempt to find a different minimum.

Returning to decision block 412, if it is determined that the improved segmented design is fabricable, then the result of decision block 412 is YES, and the method 400 proceeds to block 418. At block 418, the design optimization engine 310 stores the improved segmented design as a final segmented design, and at block 420, the design verification system 302 transmits the final segmented design to the fabrication system 318 to manufacture the physical device. The method 400 then proceeds to an end block and terminates.

FIG. 5 is a flowchart that illustrates a non-limiting example embodiment of a procedure for perturbing a segmented design according to various aspects of the present disclosure. The procedure 500 is an example of a procedure suitable for use at subroutine block 416 illustrated in FIG. 4. The procedure 500 receives a segmented design as input, and provides a perturbed version of the segmented design by adding noise around the unfabricable regions. In some embodiments, the input segmented design may include discrete values for each material (e.g., each segment may indicate presence of either a first material or a second material). In some embodiments, the input segmented design may include gradient values (e.g., each segment may indicate a percentage likelihood of a presence of a first material versus a second material, with some segments indicating a 100% likelihood of one material or the other, and some segments indicating some other likelihood between 0%-100%).

From a start block, the procedure 500 advances to block 502, where the design perturbation engine 312 generates a binarized segmented design based on the segmented design. If the input segmented design included discrete values for each material, then the design perturbation engine 312 may not have to further process the segmented design to generate the binarized segmented design, because it is already binarized. If the input segmented design includes gradient values, then the design perturbation engine 312 may compare the gradient value in each segment to a threshold value, and may assign a first material or a second material to the segment in the binarized segmented design based on how the gradient value compares to the threshold value. For example, if the threshold value is 50%, then the design perturbation engine 312 may assign the first material to segments wherein the gradient value indicates a likelihood of 50% or greater that the first material is present in the segment, and may assign the second material to other segments.

At block 504, the design perturbation engine 312 uses the paintbrush patterns to compute a paintbrush loss map. The design perturbation engine 312 may use any suitable technique to compute the paintbrush loss map using the paintbrush patterns. In some embodiments, the design perturbation engine 312 searches the segmented design for segments that are not reachable with a tiling of the paintbrush patterns, and increases a paintbrush loss value for the unreachable segments in the paintbrush loss map. In some embodiments, the design perturbation engine 312 may determine one or more forbidden patterns based on the paintbrush patterns (that is, patterns of segments that cannot be reached using any tiling of the paintbrush patterns), convolve the forbidden patterns with the segmented design, and increase a paintbrush loss in the paintbrush loss map each time a segment is found to be within a forbidden pattern. In some embodiments, other techniques may be used to determine the segments that cannot be painted using the paintbrush patterns, and the paintbrush losses for those segments in the paintbrush loss map may be increased.

At block 506, the design perturbation engine 312 determines a violations map based on the paintbrush loss map. In some embodiments, the design perturbation engine 312 labels segments within the violations map as being violation segments if the paintbrush loss for the corresponding segments in the paintbrush loss map is greater than zero, and labels the other segments within the violations map as not being violation segments. In some embodiments, a separate data structure may not be created to store the violations map, but instead the non-zero entries in the paintbrush loss map may themselves be used as the violations map.

At block 508, the design perturbation engine 312 dilates the violations map to determine a selected region of the binarized segmented design. The perturbations will be made to the selected region. By perturbing the selected region instead of the entire binarized segmented design, the procedure 500 helps preserve as much of the segmented design that is currently fabricable as possible while still perturbing the neighborhood of the unfabricable portions enough to exit the current local minimum. In some embodiments, the size of the dilation of the violations map may at first be based on the size of the paintbrush pattern. In some embodiments, the size of the dilation of the violations map may increase on future iterations if progress toward a fabricable design is not being made.

At block 510, the design perturbation engine 312 generates random noise and adds the random noise to the selected region of the binarized segmented design to create the perturbed segmented design. In some embodiments, the noise is generated as a random array that is added to the binarized segmented design within the selected region. In some embodiments, the random array may have a length scale associated with the noise. For example, the selected region may be divided into clusters based on the length scale, and all of the segments in a given cluster may be randomly assigned to the same binary value. In some embodiments, the clusters are sized to be smaller than the size of the paintbrush pattern in order to ensure that sufficient low-frequency randomness is present. For example, in some embodiments, the clusters may be sized within a size ratio of 1:5 compared to the brush to 1:2 compared to the brush. In some embodiments, the length scale for the clusters may be based on the size of the selected region.

In some embodiments, the design perturbation engine 312 may further process the random noise before or after combining it with the binarized segmented design. For example, in some embodiments, the design perturbation engine 312 may blur the random noise by, for example, convolving the random noise with a Gaussian blur filter and then rescaling the noise.

The procedure 500 then proceeds to an end block and returns the perturbed segmented design as a result of the procedure 500.

In some embodiments, the procedure 500 may determine how many iterations have occurred, and may change some of its operations during later iterations to give a stronger "push" outside of the local minimum if the perturbations are not adequate to depart the local minimum. For example, in some embodiments, the design perturbation engine 312 may increase the size of the clusters in later iterations, may increase the amplitude of the noise in later iterations, and/or may increase the size of the selected region in later iterations in order to increase the amount of perturbation.

Figure 6A:
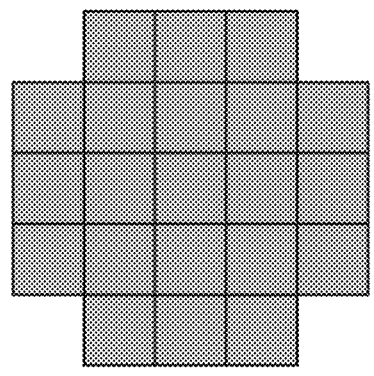
FIG. 6A-FIG. 6F are a series of schematic drawings that illustrate a non-limiting example embodiment of the generation and application of noise to a segmented design in order to create a perturbed segmented design according to various aspects of the present disclosure.
Figure 6A:
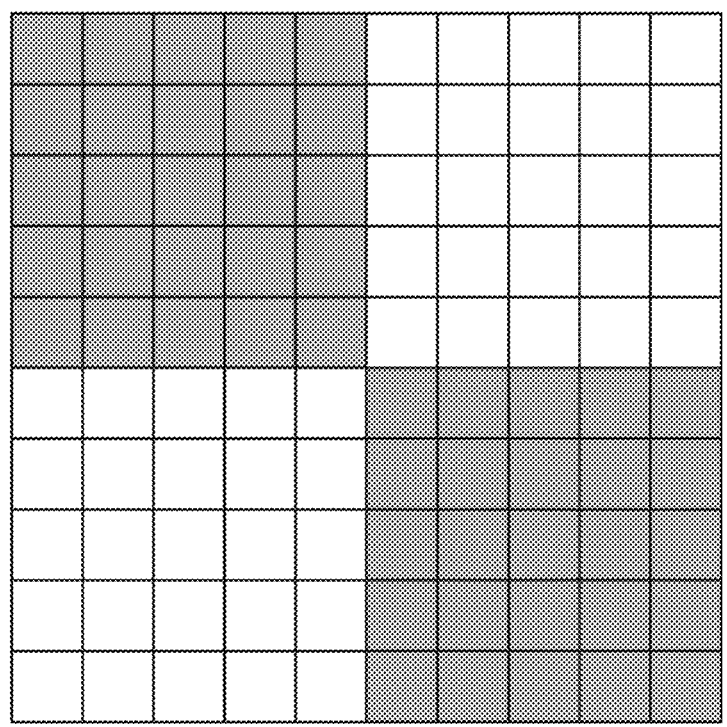

FIG. 6A-FIG. 6F are a series of schematic drawings that illustrate a non-limiting example embodiment of the generation and application of noise to a segmented design in order to create a perturbed segmented design according to various aspects of the present disclosure. In FIG. 6A, a binarized segmented design 602 is illustrated as an example of a binarized segmented design generated at block 502. It is to be understood that the binarized segmented design 602 as illustrated may be a small portion of a larger design, and is not intended to be limiting on the basis of size, number, or shape of the segments.

In the binarized segmented design 602, the segments illustrated in a dark shade indicate segments assigned to a first material, and the segments illustrated in white indicate segments assigned to a second material. FIG. 6A also illustrates a paintbrush pattern 604 for the first material. It is assumed that a paintbrush pattern for the second material would have a similar shape and size.

Figure 6B:
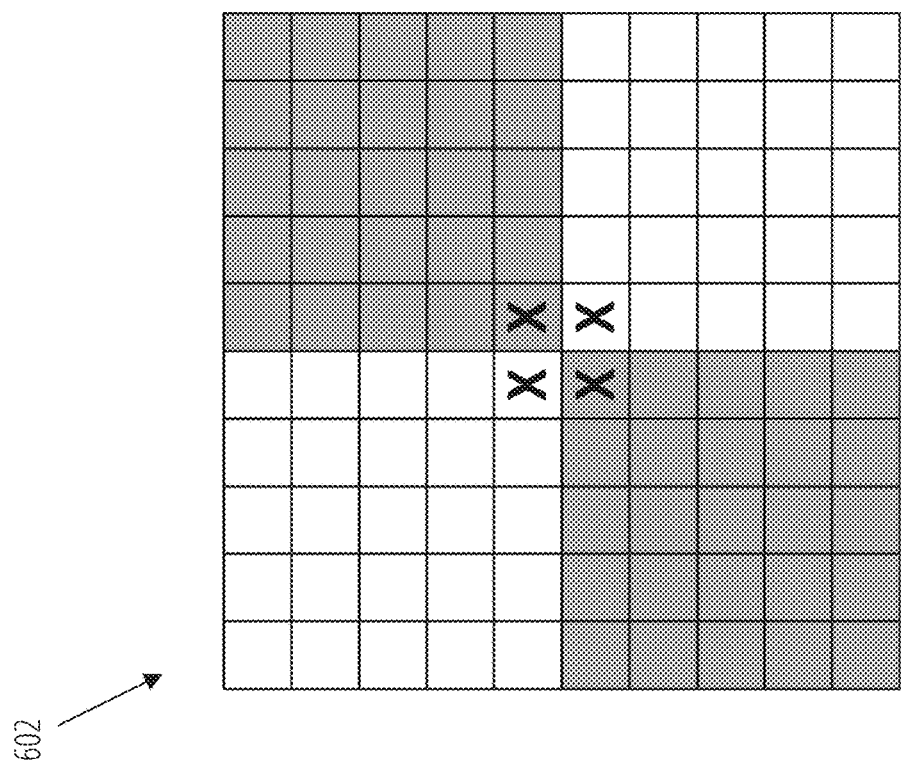

FIG. 6B illustrates the binarized segmented design 602 overlaid with a violations map. Because there is no way to fit the paintbrush pattern 604 for the first material (or the associated paintbrush pattern for the second material) to reach the four segments at the center of the binarized segmented design 602 that meet in a checkerboard pattern, these segments would have a non-zero paintbrush loss in the paintbrush loss map. Accordingly, FIG. 6B shows the corresponding violations map generated at block 506 as the segments marked with an "X". A single contiguous region of unfabricable segments is illustrated in FIG. 6B for the sake of simplicity. It will be understood that in some embodiments, multiple regions may be indicated in the violations map as including unfabricable segments.

Figure 6C:
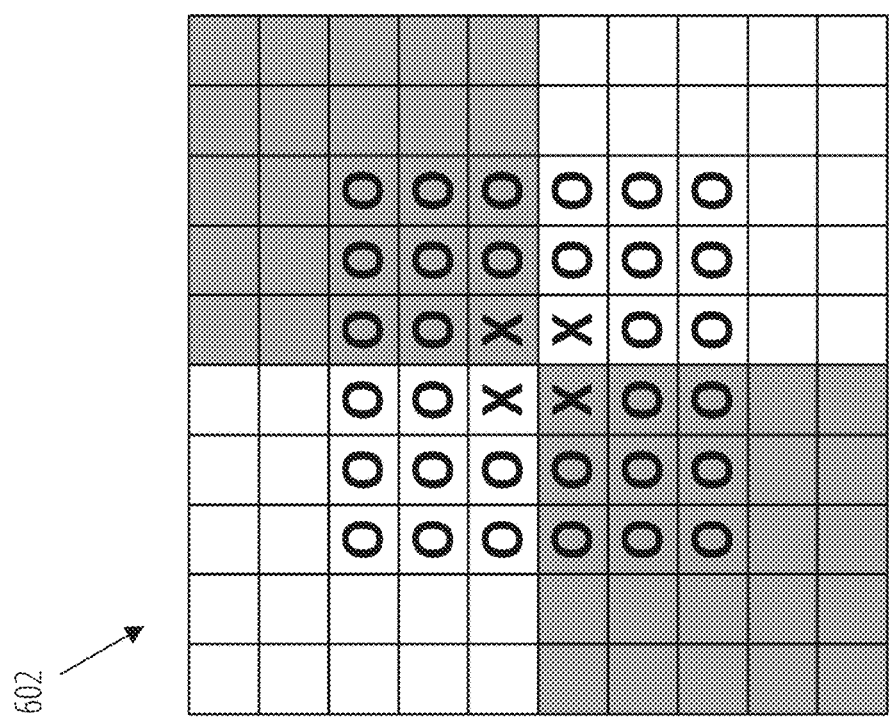

FIG. 6C illustrates a non-limiting example embodiment of a dilation of the violations map to determine a selected region as descried in block 508. As shown, the segments of the violations map are dilated using a 3×3 pattern, thus forming the selected region indicated by segments marked with an "O" in FIG. 6C. The segments of the violations map marked with an "X" are also considered part of the selected region. The 3×3 pattern used to dilate the segments of the violations map should not be seen as limiting, and in other embodiments, a pattern of any other shape or size may be used for the dilation. As discussed above, in later iterations, a larger pattern than the 3×3 pattern may be used to increase the size of the selected region.

Figure 6D:
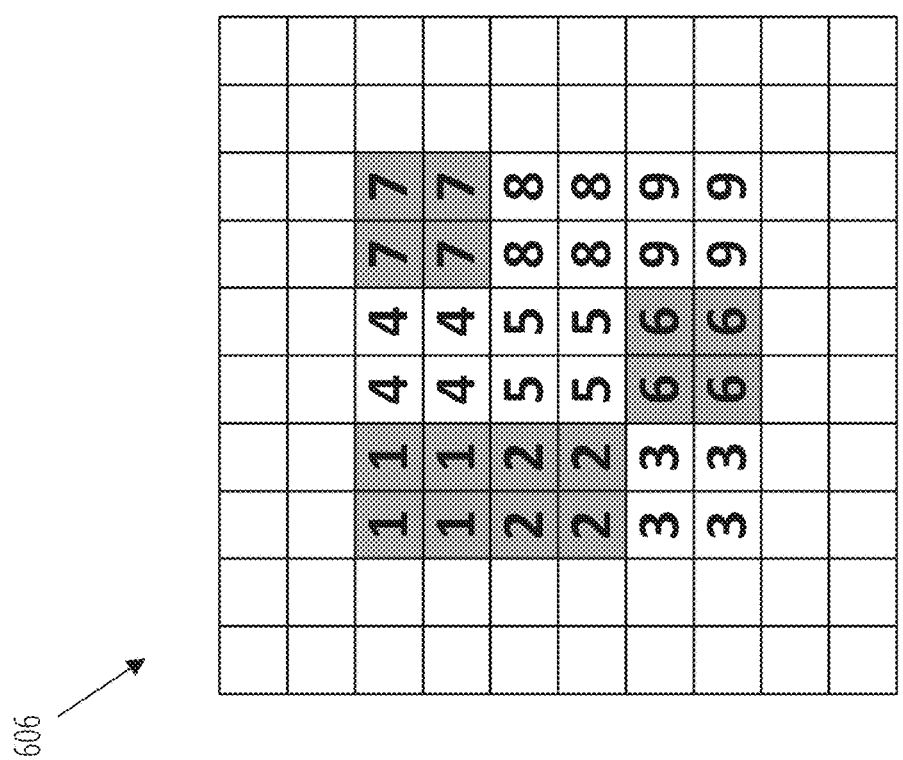

FIG. 6D illustrates a non-limiting example embodiment of a noise map 606 generated for the selected region as described in block 510. As shown, the selected region has been divided into nine 2×2 clusters of segments, each indicated by a number that marks the segments common to the cluster. The 2×2 cluster size may be chosen as appropriate based on the 5×5 size of the paintbrush pattern 604, though in other embodiments, other sizes or shapes of clusters may be used. The clusters were then each randomly assigned to either the first material or the second material. As shown, the first cluster, the second cluster, the sixth cluster, and the seventh cluster were randomly assigned to the first material, and the remaining clusters were randomly assigned to the second material.

Figure 6E:
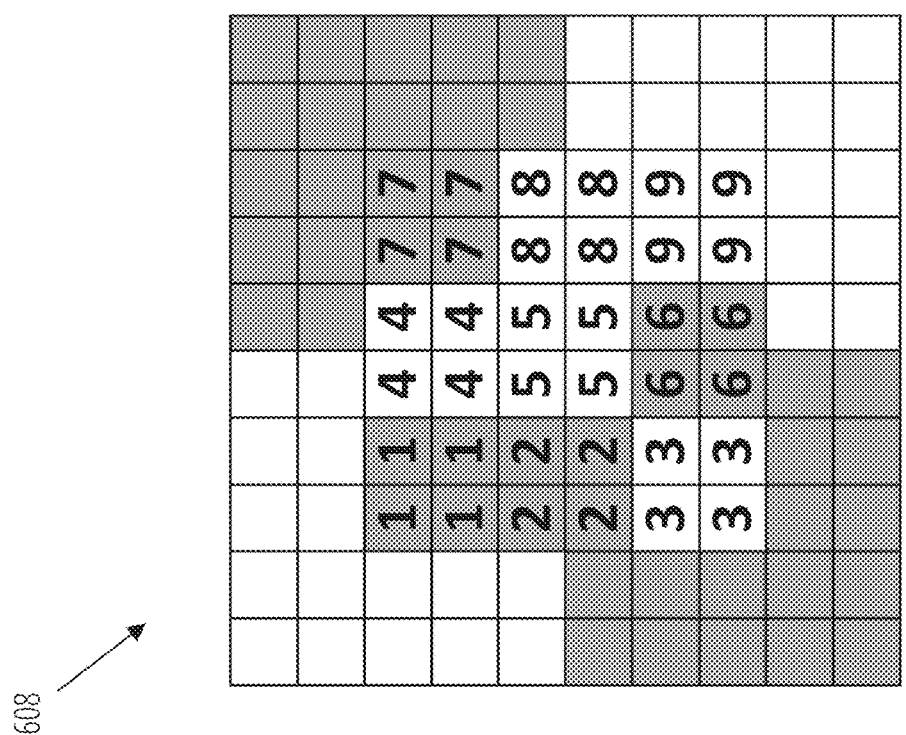
Figure 6F:
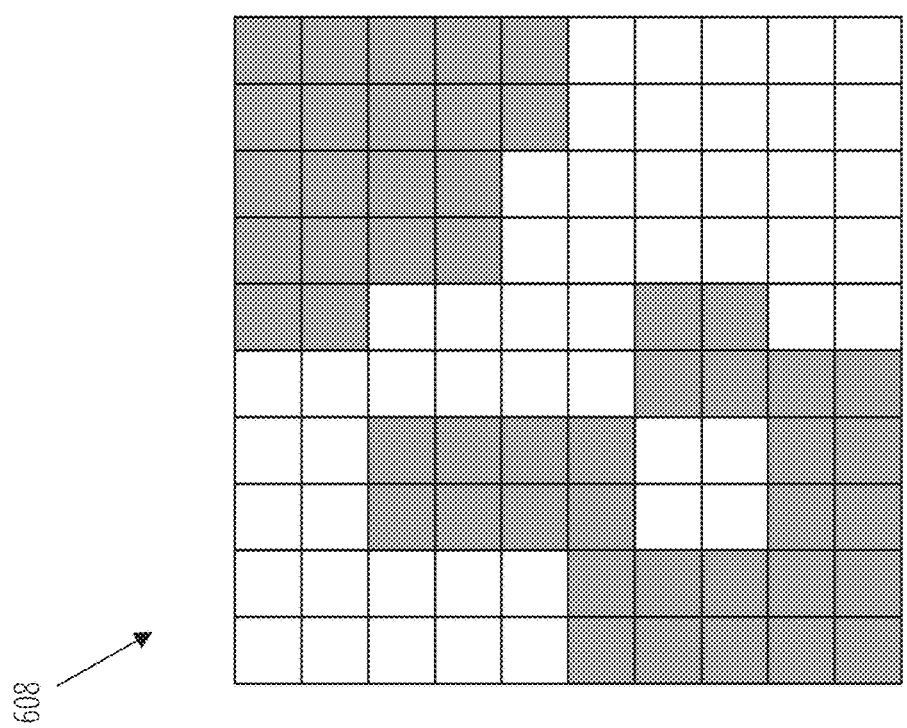

FIG. 6E illustrates the result of the noise map 606 being combined with the binarized segmented design 602 to create the perturbed segmented design 608 as described in block 510, and FIG. 6F illustrates the same perturbed segmented design 608 with the markings for the segments removed. As shown, the perturbed segmented design 608 is quite different from the starting binarized segmented design 602 illustrated in FIG. 6A within the selected region, but remains the same as the binarized segmented design 602 outside of the selected region. Accordingly, in the subsequent optimization of the perturbed segmented design 608 based in part on a fabrication loss function, the subsequent improved segmented design is likely to be different in the area around the selected region, and the overall subsequent improved segmented design will hopefully be closer to being fabricable.

If the subsequent improved segmented design is not closer to being fabricable, then one of the options discussed above is that the cluster size may be increased in order to make more dramatic changes to the binarized segmented design. FIG. 7A illustrates a non-limiting example embodiment of a noise map 702 wherein a 3×3 cluster size is used instead of the 2×2 cluster sized used in the noise map 606 discussed above. As shown, the selected region in the noise map 702 includes four clusters instead of nine, and the third cluster and fourth cluster were randomly selected to be assigned to the first material.

Figure 7B:
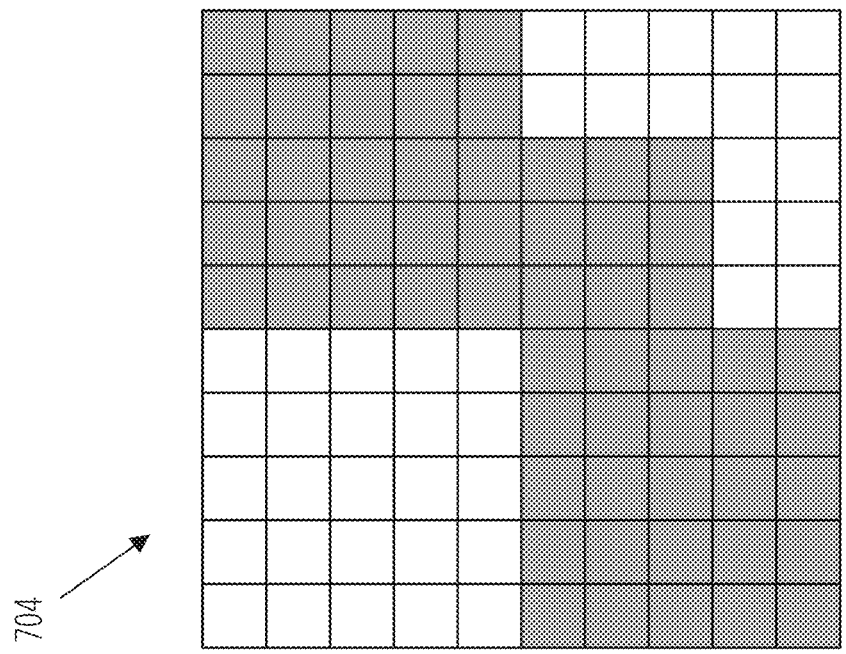
FIG. 7A and FIG. 7B illustrate another non-limiting example embodiment of the application of noise to a segmented design in order to create a perturbed segmented design according to various aspects of the present disclosure.
Figure 7A:
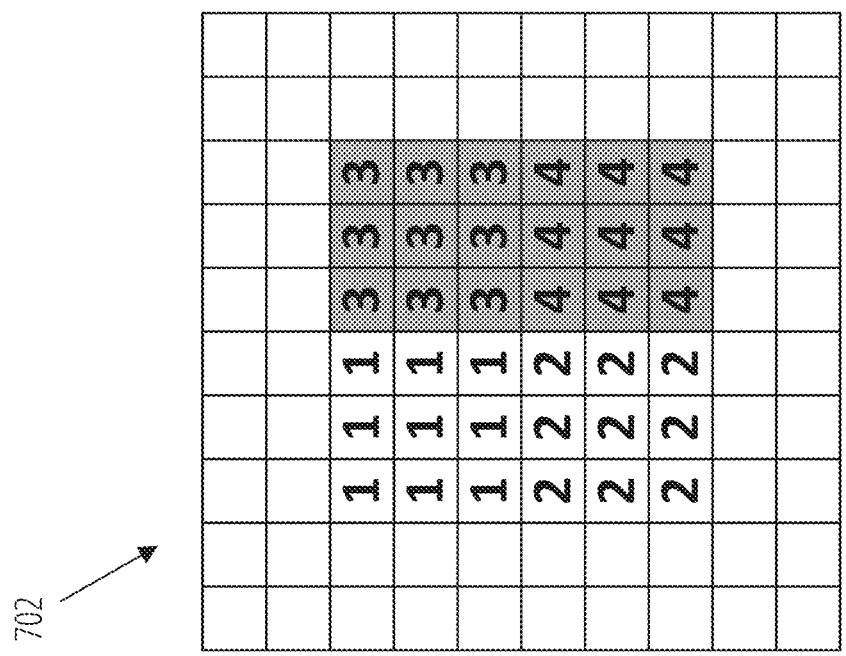

FIG. 7B illustrates a perturbed segmented design 704 wherein the binarized segmented design 602 is combined with the noise map 702. As can be seen by comparing the perturbed segmented design 704 to the perturbed segmented design 608, the perturbed segmented design 704 created using the larger cluster size is greatly different from the perturbed segmented design 608 created using the smaller cluster size. This difference is intended to provide a larger push away from the binarized segmented design 602 upon subsequent optimization of the perturbed segmented design 704, and to eventually result in convergence to a different local minimum of the performance loss function and fabrication loss function.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of creating a fabricable segmented design for a physical device, the method comprising:
receiving, by a computing system, a design specification;
optimizing, by the computing system, an initial segmented design based on the design specification to create an improved segmented design;
perturbing, by the computing system, the improved segmented design to create a perturbed segmented design; and
optimizing, by the computing system, the perturbed segmented design to create a second improved segmented design;
wherein perturbing the improved segmented design to create the perturbed segmented design includes:
determining, by the computing system, a first violations map based on the improved segmented design and at least one paintbrush pattern associated with a fabrication system;
dilating, by the computing system, the first violations map to determine a selected region;
generating, by the computing system, random noise within the selected region; and
updating, by the computing system, the improved segmented design using the random noise within the selected region; and
wherein optimizing the initial segmented design to create the improved segmented design and optimizing the perturbed segmented design to create the second improved segmented design include using at least one optimization technique selected from gradient descent, genetic design, generative design, engineering optimization, shape optimization, and topology optimization.

2. The method of claim 1, wherein dilating the first violations map to determine the selected region includes selecting a first area around each violation segment in the first violations map, wherein a size of the first area is based on a size of the at least one paintbrush pattern.

3. The method of claim 2, further comprising:
perturbing, by the computing system, the second improved segmented design;
wherein perturbing the second improved segmented design includes:
determining, by the computing system, a second violations map based on the second improved segmented design and the at least one paintbrush pattern associated with the fabrication system; and
dilating, by the computing system, the second violations map to determine a second selected region;
wherein dilating the second violations map to determine the second selected region includes selecting a second area around each violation segment in the second violations map; and
wherein a size of the second area is larger than the size of the first area.

4. The method of claim 1, wherein generating random noise within the selected region includes:
grouping, by the computing system, segments within the selected region into clusters; and
assigning, by the computing system, a random value to each cluster.

5. The method of claim 4, wherein a size of each cluster is based on a size of the at least one paintbrush pattern.

6. The method of claim 1, wherein updating the improved segmented design using the random noise within the selected region includes:
applying, by the computing system, a blur filter to the random noise to create blurred random noise; and
rescaling, by the computing system, the blurred random noise to create rescaled blurred random noise.

7. The method of claim 1, wherein optimizing the initial segmented design based on the design specification to create the improved segmented design includes:
    comparing, by the computing system, an optimized segmented design to the initial segmented design; and
    using, by the computing system, the initial segmented design as the improved segmented design to be perturbed instead of the optimized segmented design in response to determining that the initial segmented design compares better than the optimized segmented design.

8. The method of claim 7, wherein comparing the optimized segmented design to the initial segmented design includes at least one of:
    determining, by the computing system, a performance loss of the optimized segmented design and the initial segmented design; and
    determining, by the computing system, a fabrication loss of the optimized segmented design and the initial segmented design.

9. The method of claim 1, further comprising:
    determining, by the computing system, whether the second improved segmented design is fabricable; and
    in response to determining that the second improved segmented design is fabricable, transmitting, by the computing system, the second improved segmented design to a fabrication system to fabricate the physical device.

10. A non-transitory computer-readable medium having logic stored thereon that, in response to execution by one or more processors of a computing system, causes the computing system to perform actions for creating a fabricable segmented design for a physical device, the actions comprising:
    receiving, by the computing system, a design specification;
    optimizing, by the computing system, an initial segmented design based on the design specification to create an improved segmented design;
    perturbing, by the computing system, the improved segmented design to create a perturbed segmented design; and
    optimizing, by the computing system, the perturbed segmented design to create a second improved segmented design;
    wherein perturbing the improved segmented design to create the perturbed segmented design includes:
        determining, by the computing system, a first violations map based on the improved segmented design and at least one paintbrush pattern associated with a fabrication system;
        dilating, by the computing system, the first violations map to determine a selected region;
        generating, by the computing system, random noise within the selected region; and
        updating, by the computing system, the improved segmented design using the random noise within the selected region; and
    wherein optimizing the initial segmented design to create the improved segmented design and optimizing the perturbed segmented design to create the second improved segmented design include using at least one optimization technique selected from gradient descent, genetic design, generative design, engineering optimization, shape optimization, and topology optimization.

11. The non-transitory computer-readable medium of claim 10, wherein dilating the first violations map to determine the selected region includes selecting a first area around each violation segment in the first violations map, wherein a size of the first area is based on a size of the at least one paintbrush pattern.

12. The non-transitory computer-readable medium of claim 11, wherein the actions further comprise:
    perturbing, by the computing system, the second improved segmented design;
    wherein perturbing the second improved segmented design includes:
        determining, by the computing system, a second violations map based on the second improved segmented design and the at least one paintbrush pattern associated with the fabrication system; and
        dilating, by the computing system, the second violations map to determine a second selected region;
    wherein dilating the second violations map to determine the second selected region includes selecting a second area around each violation segment in the second violations map; and
    wherein a size of the second area is larger than the size of the first area.

13. The non-transitory computer-readable medium of claim 10, wherein generating random noise within the selected region includes:
    dividing, by the computing system, segments within the selected region into clusters; and
    assigning, by the computing system, a random value to each cluster.

14. The non-transitory computer-readable medium of claim 13, wherein a size of each cluster is based on a size of the at least one paintbrush pattern.

15. The non-transitory computer-readable medium of claim 10, wherein updating the improved segmented design using the random noise within the selected region includes:
    applying, by the computing system, a blur filter to the random noise to create blurred random noise; and
    rescaling, by the computing system, the blurred random noise to create rescaled blurred random noise.

16. The non-transitory computer-readable medium of claim 10, wherein optimizing the initial segmented design based on the design specification to create the improved segmented design includes:
    comparing, by the computing system, an optimized segmented design to the initial segmented design; and
    using, by the computing system, the initial segmented design as the improved segmented design to be perturbed instead of the optimized segmented design in response to determining that the initial segmented design compares better than the optimized segmented design.

17. The non-transitory computer-readable medium of claim 16, wherein comparing the optimized segmented design to the initial segmented design includes at least one of:
    determining, by the computing system, a performance loss of the optimized segmented design and the initial segmented design; and
    determining, by the computing system, a fabrication loss of the optimized segmented design and the initial segmented design.

18. The non-transitory computer-readable medium of claim 10, wherein the actions further comprise:
    determining, by the computing system, whether the second improved segmented design is fabricable; and
    in response to determining that the second improved segmented design is fabricable, transmitting, by the computing system, the second improved segmented design to a fabrication system to fabricate the physical device.

\* \* \* \* \*